UNITED STATES PATENT OFFICE.

CHRISTOPHER G. MEMMINGER, OF LAKELAND, FLORIDA, ASSIGNOR TO CORONET PHOSPHATE COMPANY, OF NEW YORK, N. Y., A CORPORATION OF NEW YORK.

TREATING PHOSPHATES.

1,192,545.  Specification of Letters Patent.  Patented July 25, 1916.

No Drawing.  Application filed December 4, 1915. Serial No. 64,958.

*To all whom it may concern:*

Be it known that I, CHRISTOPHER G. MEMMINGER, a citizen of the United States, residing at Lakeland, in the county of Polk and State of Florida, have invented an Improved Process of Treating Phosphates, of which the following is a specification.

I am aware that heretofore various methods have been employed in the treatment of crude or raw phosphate materials, by the application of heat and the admixture of alkali bases, to produce a citrate soluble fertilizer. In contradistinction to these methods my present invention relates to the treatment of crude phosphate materials to increase the available percentage of phosphoric acid therein, and which material after treatment may be worked up by any desired process into fertilizers.

I have found in working out my invention or discovery that by the application of intense heat, to certain crude phosphate materials, which contain a sufficient percentage of free silica, the organic matter and the water of combination are first driven off or ter of combination are first driven off or eliminated, then the calcium carbonate is decomposed into carbon dioxid which passes off with the other volatile constituents, and into calcium oxid which combines with the silica producing calcium silicate in the treated material which replaces the calcium carbonate in the raw or crude material. For example the following is an analysis of certain material giving the percentages of the changes in certain constituents thereof both before treatment and after treatment:—

| | Before treatment. | After treatment. |
|---|---|---|
| Silica, SiO₂ | 7.55% | 6.48% (8.10%) |
| Calcium sulfate, CaSO₄ | 0.39% | 0.13% |
| Calcium carbonate, CaCO₃ | 3.55% | 0.00% |
| Calcium silicate, CaSiO₃ | 0.00% | 3.39% |
| Organic matter and water of combination | 3.53% | 0.00% |

The material to which my process is applicable also contains a large percentage of phosphoric acid combined as tri-basic calcium phosphate, and may also contain certain percentages of various other materials such as oxid of iron, oxid of aluminum, and the fluorid of lime. The percentage of the phosphoric acid combined as tri-basic calcium phosphate is materially increased by my process, this being the object of my invention; and the percentages of the other named ingredients is also materially increased, although none of these ingredients undergoes any chemical change in the treatment. The increase in the percentages of these ingredients is due merely to the elimination of the organic matter and the water of combination, as well as of other volatile matter if such there be in the crude material. It will also be seen that the percentage (8.10 per cent.) of the silica after treatment includes not only the free silica (6.48 per cent.) but also 1.62 per cent. of silica which is combined with the lime, CaO, resulting from the decomposition of the calcium carbonate.

The only material chemical action which takes place in the treatment is therefore, $$CaCO_3 + heat = CaO + CO_2$$

and $$CaO + SiO_2 = CaSiO_3.$$

In this as will be understood the treatment of the crude or raw material consists in the application of sufficient heat thereto to decompose and drive off the organic matter and the water of combination, to decompose the calcium carbonate, and cause the calcium oxid to combine with the silica, thereby replacing the calcium carbonate by calcium silicate.

From the foregoing analysis it will also be observed that the calcium sulfate which it might be natural to suppose would increase, as a matter of fact actually decreases. This no doubt indicates that approximately two thirds of the calcium sulfur decomposes, the sulfid dioxid being driven off, while a part of the carbon of the organic matter combines with the surplus oxygen to form carbon dioxid, and the remaining lime combines with the silica to form calcium silicate. This, however, is only a minor and relatively unimportant reaction.

It will be furthermore understood that the success of the hereinbefore described method of treating crude phosphate material is dependent upon there being a sufficient amount of free silica in the original material to combine with the calcium oxid. I have found by actual tests that if there is a deficiency of silica in the raw material instead of calcium silicate being produced, the elimination of the carbon dioxid merely produces calcium oxid, which, of course, when exposed to the air forms slaked lime and leaves the material in a very unsatisfactory condition and in which it could not possibly be worked up into a fertilizer. It consequently follows, as hereinbefore also stated, that a certain percentage of free silica in the raw or crude material is absolutely necessary to the successful treatment of the material in accordance with this invention.

When it is understood that in many places the use of phosphates is regulated and determined by the percentage of phosphoric acid therein, and that the material treated by my improved process is sold and shipped in bulk, largely in cargo lots, the importance of this invention, from a commercial standpoint, will be readily appreciated.

I claim as my invention:

The hereinbefore described method of treating raw phosphate material, containing free silica, to increase the percentage of phosphoric acid therein, consisting in applying sufficient heat to the raw phosphate material under oxidizing conditions to decompose the calcium carbonate therein, and cause the calcium oxid thus formed to combine with the free silica.

Signed by me this 26th day of November, 1915.

CHRISTOPHER G. MEMMINGER.